(12) United States Patent
Shim et al.

(10) Patent No.: US 8,775,139 B2
(45) Date of Patent: Jul. 8, 2014

(54) METHOD FOR SIMULATING FLUID FLOW AND RECORDING MEDIUM FOR PERFORMING THE METHOD

(75) Inventors: Jae Wan Shim, Seoul (KR); Hyun Cheol Koo, Seoul (KR); Suk Hee Han, Seoul (KR); Byoung Chul Min, Seoul (KR); Jun Woo Choi, Busan (KR); Kyung Ho Shin, Seoul (KR); Jin Dong Song, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 264 days.

(21) Appl. No.: 13/162,406

(22) Filed: Jun. 16, 2011

(65) Prior Publication Data

US 2012/0296615 A1    Nov. 22, 2012

(30) Foreign Application Priority Data

May 16, 2011    (KR) .......................... 10-2011-0045840

(51) Int. Cl.
*G06G 7/50* (2006.01)
*G06G 7/48* (2006.01)
*G06F 17/50* (2006.01)
*G06T 13/20* (2011.01)
*G06T 13/80* (2011.01)

(52) U.S. Cl.
CPC ........ *G06F 17/5018* (2013.01); *G06F 17/5009* (2013.01); *G06T 13/20* (2013.01); *G06T 13/80* (2013.01)
USPC .................................................. 703/9; 703/2

(58) Field of Classification Search
CPC . G06F 17/5018; G06F 17/5009; G06T 13/20; G06T 13/80

USPC .......................................................... 703/9, 2
See application file for complete search history.

(56) References Cited

U.S. PATENT DOCUMENTS

| 5,606,517 | A * | 2/1997 | Traub et al. ...................... 703/9 |
| 7,558,714 | B2 * | 7/2009 | Shan et al. ........................ 703/9 |
| 8,224,633 | B2 * | 7/2012 | Shan et al. ........................ 703/9 |

OTHER PUBLICATIONS

Alexander J. Wagner, "A Practical Introduction to the Lattice Boltzmann Method", Mar. 2008, North Dakota State University.*
Heuveline, et al., "Towards a Hybrid Parallelization of Lattice Boltzmann Methods", Computers and Mathematics with Applications 58, 2009.*
Krause, "Fluid Flow Simulation and Optimisation with Lattice Boltzmann Methods on High Performance Computers", Jul. 2010.*
Richard et al., "Lattice Boltzmann Method for CFD", Dept. of Aerospace Engineering, Texas A&M, Dec. 1, 2003.*
D. Raabe, "Overview on the Lattice Boltzmann Method for Nano- and Microscale Fluid Dynamics in Materials Science and Engineering", Max-Planck-Institut für Eisenforschung: Lattice Boltzmann Fluid Dynamics, Feb. 7, 2008.*

(Continued)

*Primary Examiner* — Mary C Jacob
(74) *Attorney, Agent, or Firm* — Fenwick & West LLP (57) ABSTRACT

A method for simulating fluid flow includes: discretizing a space in which a fluid flows into a regular lattice; assuming that fluid particles repetitively move and collide in the lattice; deriving a univariate polynomial equation by comparing the n-th (n is a non-negative integer) order momentum of velocity between the Maxwell-Boltzmann distribution and the discretized Maxwell-Boltzmann distribution; calculating the weight coefficients corresponding to the discrete velocities of the fluid particles based on the univariate polynomial equation; and deriving a lattice Boltzmann model using the weight coefficients. A lattice Boltzmann model with superior stability and accuracy may be derived easily.

8 Claims, 8 Drawing Sheets

(56) References Cited

OTHER PUBLICATIONS

He et al., "Theory of the lattice Boltzmann method: From the Boltzmann equation to the lattice Boltzmann equation", Physical Review E vol. 56, No. Dec. 6, 1997.*
http://mathonweb.com/help_ebook/html/numbers_8.htm, archived on Sep. 14, 2009.*
Zang et al, "Lattice Boltzmann Simulation of Rarefied Gas Flows in Microchannels", Physical Review E, 71, 2005.*
Wolfram Mathworld, "Floor Function", definition, downloaded Aug. 28, 2013.*
Yang et al, "Rarefied Flow Computations Using Nonlinear Model Boltzmann Equations", Journal of Computational Physics 120, pp. 323-339, 1995.*
Cercignani, C., "Mathematical Methods in Kinetic Theory, Second Edition," 1990, Preface, p. v, Chapter 1, pp. 1-5, Plenum Press, New York, USA.
Chen, H. et al., "Recovery of the Navier-Stokes Equations Using a Lattice-Gas Boltzmann Method," *Physical Review A*, Apr. 15, 1992, pp. R5339-R5342, vol. 45, No. 8.
Chikatamarla, S. et al., "Entropy and Galilean Invariance of Lattice Boltzmann Theories," *Physical Review Letters*, Nov. 10, 2006, pp. 190601-1 through 190601-4, vol. 97.
Chikatamarla, S. et al., "Lattices for the Lattice Boltzmann Method," *Physical Review E*, 2009, pp. 046701-1 through 046701-18, vol. 79.
Courant, R. et al., "Applied Mathematical Sciences, 21: Supersonic Flow and Shock Waves," 1976, pp. 181-182, Springer-Verlag, New York, USA.
Frisch, U. et al., "Lattice-Gas Automata for the Navier-Stokes Equation," *Physical Review Letters*, Apr. 7, 1986, pp. 1505-1508, vol. 56, No. 14.
He, X. et al., "Theory of the Lattice Boltzmann Method: From the Boltzmann Equation to the Lattice Boltzmann Equation," *Physical Review E*, Dec. 1997, pp. 6811-6817, vol. 56, No. 6.
Philippi, P. et al., "From the Continuous to the Lattice Boltzmann Equation: The Discretization Problem and Thermal Models," *Physical Review E*, 2006, pp. 056702-1 through 056702-12, vol. 73.
Qian, Y.H. et al., "Complete Galilean-Invariant Lattice BGK Models for the Navier-Stokes Equation," *Europhysics Letters*, May 15, 1998, pp. 359-364, vol. 42, No. 4.
Qian, Y.H. et al., "Lattice BGK Models for Navier-Stokes Equation," *Europhysics Letters*, 1992, pp. 479-484, vol. 17, No. 6.
Shan, X. et al., "Kinetic Theory Representation of Hydrodynamics: A Way Beyond the Navier-Stokes Equation," *Journal of Fluid Mechanics*, 2006, pp. 413-441, vol. 550.
Shim, J.W. "Uniform Polynomial Equations Providing Higher-order Multi-Dimensional Models in Lattice Boltzmann Theory," May 10, 2011, seven pages, Cornell University Library, New York, USA.
Shim, J.W. et al., "Robust Thermal Boundary Conditions Applicable to a Wall Along Which Temperature Varies in Lattice-Gas Cellular Automata," *Physical Review E*, 2010, pp. 046703-1 through 046703-10, vol. 81.
Shim, J.W., "Univariate Polynomial Equation Providing Models of Thermal Lattice Boltzmann Theory," Mar. 27, 2011, 9 pages, Cornell University Library, New York, USA.

\* cited by examiner

METHOD FOR SIMULATING FLUID FLOW AND RECORDING MEDIUM FOR PERFORMING THE METHOD

CROSS-REFERENCE TO RELATED APPLICATIONS

This application claims priority under 35 U.S.C. §119 to Korean Patent Application No. 10-2011-0045840, filed on May 16, 2011, in the Korean Intellectual Property Office, the disclosure of which is incorporated herein by reference in its entirety.

TECHNICAL FIELD

The present disclosure relates to a method for simulating fluid flow and a recording medium for performing the method, and in particular, to a method for simulating fluid flow using the lattice Boltzmann model and a recording medium for performing the method.

BACKGROUND

When designing, for example, a submarine or an airplane, it is necessary to predict the physical properties of the fluid around the object. The distribution of the physical properties (pressure, velocity, temperature, etc.) may be obtained by solving the governing equations such as the Navier-Stokes equations. However, since it is very difficult, approximated solutions are obtained by, for example, using the finite element method.

However, since this method is based on the continuum hypothesis, it cannot provide right solutions for rarefied gas or fluids flowing around micro- or nano-sized objects.

Furthermore, the conventional methods do not provide accurate predictions about dynamics of complex fluid systems, bubbles or droplets, wetting on solid surfaces, interfacial slip, fluid flow through porous materials, fluid flow through blood vessels, and so forth.

Molecular dynamics, wherein a fluid is not viewed as a continuum but as a set of particles constituting it and equations of motion are solved for the individual particles in the molecular level, may be employed to solve the problem. But, it is very inefficient. One of the methods presented to solve this problem is the lattice Boltzmann method.

In this scheme, the solution may be obtained by a discretization or discrete process of the Boltzmann equation and the Bhatnagar-Gross-Krook (BGK) collision term. However, use of the lattice Boltzmann method has been used mainly restricted for isothermal fluids. Although the thermal lattice Boltzmann method has been proposed to treat nonisothermal i.e. thermal fluids, it has many problems associated with stability, accuracy, and efficiency.

The modifier "thermal" in the thermal lattice Boltzmann method is given to denote that the method is applicable to thermal fluids as well as isothermal fluids, whereas the early lattice Boltzmann methods are applicable only to isothermal fluids.

SUMMARY

The present disclosure is directed to providing methods for simulating fluid flow, deriving stable, efficient, and accurate lattice Boltzmann models efficiently by obtaining the weight coefficients of the discretized equilibrium distribution that defines the probability of the fluid particles having a specific discrete velocity among a given set of the discrete velocities.

The present disclosure is also directed to providing a recording medium for performing the method for simulating fluid flow.

In one general aspect, the present disclosure provides a method for simulating fluid flow including: a step of discretizing a space in which a fluid flows into a regular lattice; a step of assuming that fluid particles repetitively move and collide in the lattice; a step of deriving a univariate polynomial equation by comparing the n-th (n is a non-negative integer) order momentum of velocity between the Maxwell-Boltzmann distribution and the discretized Maxwell-Boltzmann distribution; a step of calculating the weight coefficients corresponding to the discrete velocities of the fluid particles based on the univariate polynomial equation; and a step of deriving a lattice Boltzmann model using the weight coefficients.

In an embodiment of the present disclosure, a step of measuring at least one of physical properties including temperature, density, pressure and speed of the fluid based on the lattice Boltzmann model may be further included.

In an embodiment of the present disclosure, the spacing between lattice sites of the lattice may correspond to the mean free path.

In an embodiment of the present disclosure, the fluid particles exist only on the lattice sites of the lattice.

In an embodiment of the present disclosure, the step of calculating the weight coefficients of the fluid particles may further include a step of determining the approximate values of the weight coefficients by rounding off at a predetermined decimal point.

In an embodiment of the present disclosure, the space in which the fluid flows may be a 1-dimensional space.

In an embodiment of the present disclosure, the Gaussian Gamma function may be used in the step of deriving the univariate polynomial equation.

The step of deriving the univariate polynomial equation may include a step of defining the discrete velocities $v_i$, and the weight coefficients $w_i$ as follows:

$$v_1 = 0, v_{2i} > 0,$$

$$v_2 < v_4 < \ldots < v_{q-1},$$

$$v_{2i} = -v_{2i+1},$$

and $$w_{2i} = w_{2i+1}$$

for $i = 1, 2, \ldots, [q/2]$
wherein $[x]$ is the last integer that is smaller than or equal to $x$, and $q$ is an odd number.

In an embodiment of the present disclosure, the step of deriving the univariate polynomial equation may further include a step of defining the ratio of the discrete velocities $v_i$ as follows:

$$v_{2(i+1)}/v_2 = p_{2(i+1)}/p_2 = \bar{p}_{2(i+1)}$$

for $i = 1, 2, \ldots, [q/2]-1$,
wherein $p_2$ and $p_{2(i+1)}$ are relatively prime and $p_{2(i+1)} > p_{2i}$.

In an embodiment of the present disclosure, the step of deriving the univariate polynomial equation may further include a step of deriving the univariate polynomial equation as follows:

$$\bar{p}^{q+1} A^{-1} \Gamma = (2v_2^{q+1})^{-1} \Gamma(((q+1)+1)/2),$$

wherein w, A, $\bar{p}^n$ and $\Gamma$ are respectively, $$w = \begin{bmatrix} w_2 \\ w_4 \\ \vdots \\ w_{q-1} \end{bmatrix},$$

$$A = \begin{bmatrix} \bar{p}_2^2 & \bar{p}_4^2 & \cdots & \bar{p}_{q-1}^2 \\ \bar{p}_2^4 & \bar{p}_4^4 & \cdots & \bar{p}_{q-1}^4 \\ \vdots & \vdots & \ddots & \vdots \\ \bar{p}_2^{q-1} & \bar{p}_4^{q-1} & \cdots & \bar{p}_{q-1}^{q-1} \end{bmatrix},$$

$$\bar{p}^n = \begin{bmatrix} \bar{p}_2^n \\ \bar{p}_4^n \\ \vdots \\ \bar{p}_{q-1}^n \end{bmatrix}^T, \text{ and}$$

$$\Gamma = \frac{1}{2} \begin{bmatrix} v_2^{-2}\Gamma((2+1)/2) \\ v_2^{-4}\Gamma((4+1)/2) \\ \vdots \\ v_2^{-(q-1)}\Gamma(((q-1)+1)/2) \end{bmatrix},$$

is an odd number, the subscript T is used for a transpose, $\bar{p}_{2(i+1)}$ is the magnitude of $v_{2(i+1)}$ relative to $v_2$, $\bar{p}_2=1$, $Aw=\Gamma$, $\bar{p}^{q+1}w=(2v_2^{q+1})^{-1}\Gamma(((q+1)+1)/2)$, and $\Sigma_i w_i = \sqrt{\pi}$.

In another general aspect, the present disclosure provides a computer-readable recording medium wherein a computer program for performing the method for simulating fluid flow is recorded.

Other features and aspects will be apparent from the following detailed description, the drawings, and the claims.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of the example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
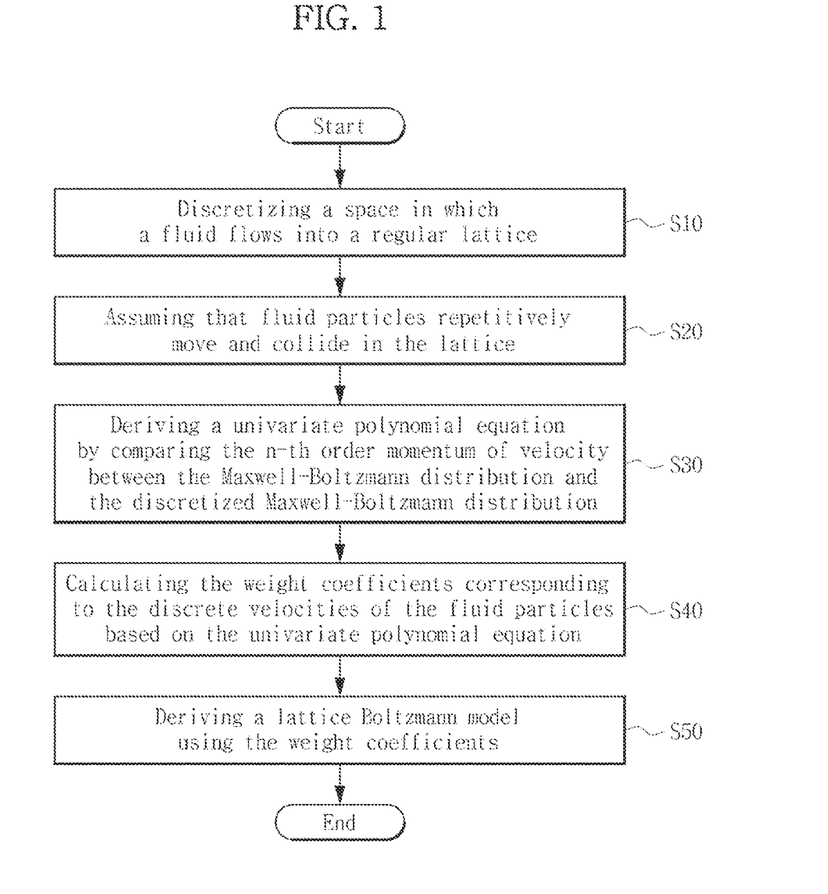
FIG. 1 is a flow chart illustrating a method for simulating fluid flow according to an embodiment of the present disclosure.

FIG. 1 is a flow chart illustrating a method for simulating fluid flow according to an embodiment of the present disclosure.

Referring to FIG. 1, a space in which a fluid flows is discretized into a regular lattice (S10).

To use the lattice Boltzmann method, one of the techniques for interpreting fluid flow numerically, the continuous space is discretized into a regular lattice. It is assumed that imaginary particles of the fluid flow in the lattice, and they are referred to as fluid particles.

The macroscopic variable of the fluid may be determined from the velocity distribution function of the particles, and the physical parameters of the fluid may be obtained therefrom. The physical parameters may include, for example, temperature, density, pressure and speed of the fluid depending on time.

The space in which the fluid flows may be 1-dimensional, 2-dimensional or 3-dimensional. Examples of discretizing the space in which the fluid flows into a regular lattice are described referring to FIGS. 2A through 6C. In the following examples of discrete velocities of the lattice Boltzmann models, particles having discrete velocities move in a lattice space consisting of lattice sites where the particles may exist in discretized time.

Figure 2A:
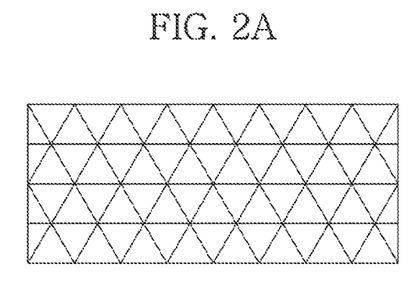
FIGS. 2A to 2C schematically show 2-dimensional and 3-dimensional space lattices used in the lattice Boltzmann method.
Figure 2B:
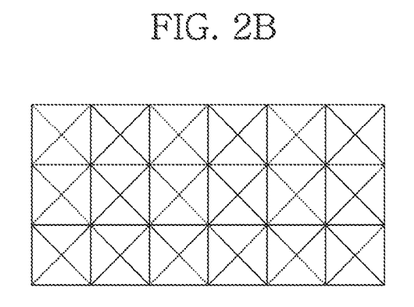
Figure 2C:
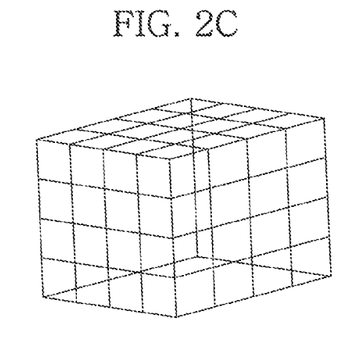
Figure 3A:
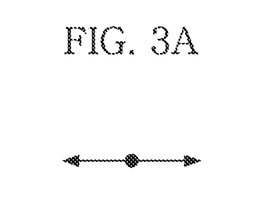
FIGS. 3A to 3C schematically show discrete velocity models of a 1-dimensional lattice Boltzmann model.
Figure 3B:
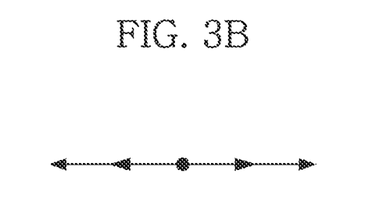
Figure 3C:
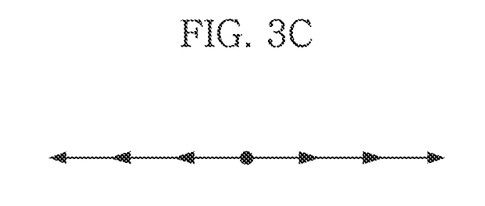

FIGS. 2A to 2C schematically show 2-dimensional and 3-dimensional space lattices used in the lattice Boltzmann method. FIGS. 3A to 3C schematically show discrete velocity models of a 1-dimensional lattice Boltzmann model. FIGS. 4A to 4C and FIGS. 5A to 5C schematically show discrete velocity models of a 2-dimensional lattice Boltzmann model. And, FIGS. 6A to 6C schematically show discrete velocity models of a 3-dimensional lattice Boltzmann model.

Referring to FIGS. 2A to 2C, the space in which the fluid flows may be divided into finite elements of a lattice. FIGS. 2Aa to 2C schematically show the space in which the fluid flows, divided into finite elements of a lattice.

FIGS. 2A and 2B show 2-dimensional lattices. FIG. 2A shows a hexagonal lattice, and FIG. 2B shows a square lattice. FIG. 2C shows a 3-dimensional lattice, in the form of a cube having sides of unit length.

As seen from FIGS. 2A to 2C, the space in which the fluid flows may be discretized into a regular lattice such that isotropy and consistency may be maintained. The spacing between lattice sites of the lattice may correspond to the mean free path.

The number of cells in the lattices shown in FIGS. 2A to 2C is only exemplary, and the number of the cells may be increased or decreased in other embodiments of the present disclosure.

FIGS. 3A to 3C schematically show discrete velocity models of a 1-dimensional lattice Boltzmann model. FIG. 3A shows a set of three discrete velocity models having a magnitude of 0 or 1. FIG. 3B shows a set of five discrete velocity models having a magnitude of 0, 1 or 2. And, FIG. 3C shows a set of seven discrete velocity models having a magnitude of 0, 1, 2 or 3.

Figure 4A:
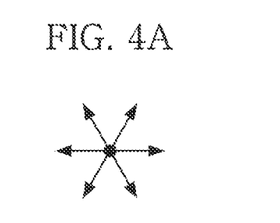
FIGS. 4A to 4C and FIGS. 5A to 5C schematically show discrete velocity models of a 2-dimensional lattice Boltzmann model.
Figure 4B:
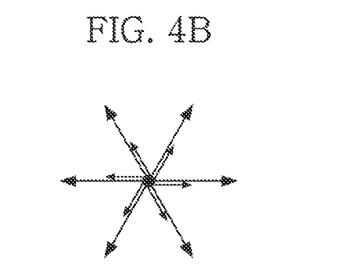
Figure 4C:
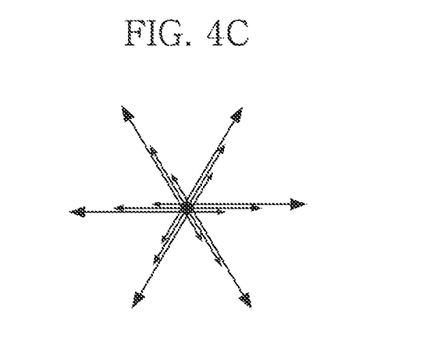

FIGS. 4A to 4C show discrete velocity models of a 2-dimensional, hexagonal lattice Boltzmann model. FIG. 4A shows a set of seven discrete velocity models having a magnitude of 0 or 1. FIG. 4B shows a set of thirteen discrete velocity models having a magnitude of 0, 1 or 2. And, FIG. 4C shows a set of nineteen discrete velocity models having a magnitude of 0, 1, 2 or 3.

Figure 5A:
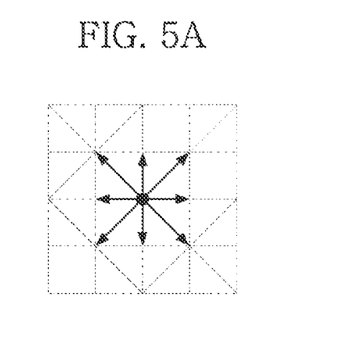
Figure 5B:
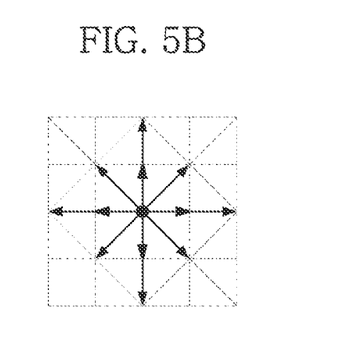
Figure 5C:
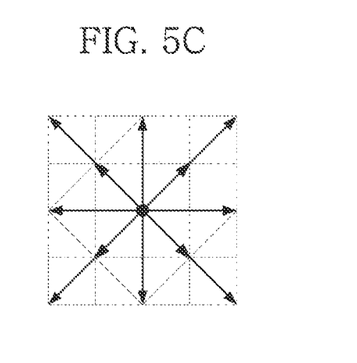
Figure 6A:
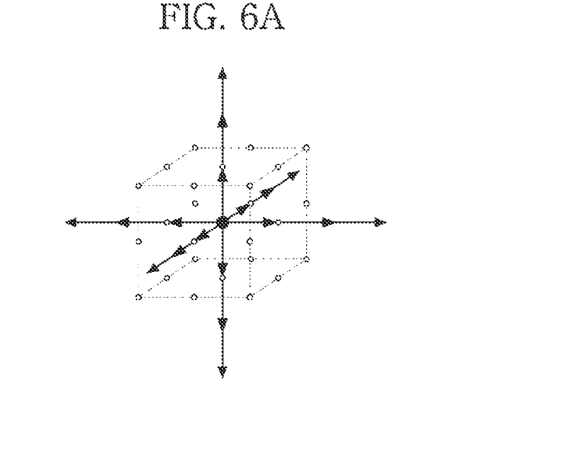
FIGS. 6A to 6C schematically show discrete velocity models of a 3-dimensional lattice Boltzmann model.
Figure 6B:
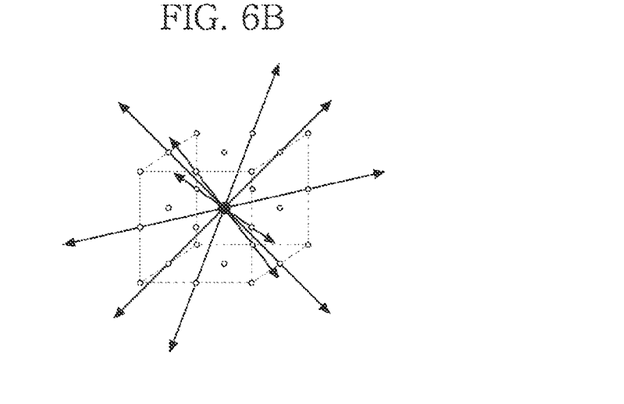
Figure 6C:
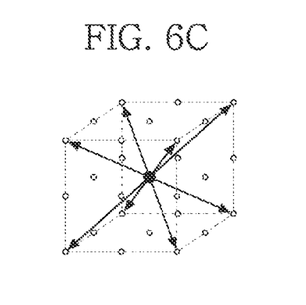

FIGS. 5A to 5C show discrete velocity models of a 2-dimensional, square lattice Boltzmann model. FIG. 5A shows a set of nine velocity models including zero. FIG. 5B shows a set of thirteen discrete velocity models including zero. And, FIG. 5C shows a set of another thirteen discrete velocity models including zero.

FIGS. 6A to 6C show discrete velocity models of a 3-dimensional, cubic lattice Boltzmann model.

After the space in which the fluid flows is discretized into the regular lattice (S10), it is assumed that the fluid particles repetitively move and collide in the lattice (S20).

The fluid particles repetitively move and collide in the lattice. In other words, a cycle of the movement and the collision processes is repeated. The imaginary particles of the fluid move only on the lattice sites of the lattice, and thus may exist only on the lattice sites. That is to say, the imaginary particles of the fluid are distributed hopping between the lattice sites in the discretized space with a discrete velocity.

Under this assumption, a univariate polynomial equation is derived by comparing the n-th order momentum of velocity between the Maxwell-Boltzmann distribution and the discretized Maxwell-Boltzmann distribution (S30).

Hereinafter, the process of deriving the univariate polynomial equation will be described in detail. The symbols will be defined only once when they appear first.

The Boltzmann equation is a non-linear differential equation and includes the Bhatnagar-Gross-Krook (BGK) collision term. The BGK collision term describes how the physical properties of a particle changes before and after collision. Using a relatively simple BGK collision term and assuming that there is no external force, the Boltzmann equation may be defined by Equation 1.

$$\partial_t f + V \cdot \nabla f = -(f - f^{eq})/\tau \quad \text{[Equation 1]}$$

In the equation, $f$ is defined by the infinitesimal quantity, $f^{dxdV}$ describing the number of particles having microscopic velocity V in an infinitesimal element of phase space dxdV at position x and time t. The microscopic velocity is distinguished from the macroscopic velocity. The latter refers to the velocity of the fluid, whereas the former refers to the velocity of individual particles constituting the fluid. Note that $$\partial_t \equiv \frac{\partial}{\partial t}$$

is the partial derivative with respect to time and $$\nabla \equiv \frac{\partial}{\partial x}$$

is the gradient operator.

The relaxation time $\tau$ adjusts the tendency of the velocity distribution to approach the Maxwell-Boltzmann (MB) distribution due to collision between the particles. From the MB distribution function $f^{eq}$, macroscopic physical properties may be obtained by Equation 2.

$$\rho\{1, U, e\} = \int f\{1, V, 2^{-1}\|V-U\|^2\} dV \quad \text{[Equation 2]}$$

where $\rho$ is number density, U is macroscopic velocity, and e is energy per mass unit. e may be related with temperature T by Equation 3.

$$e = D k_B T/(2 m_g) \quad \text{[Equation 3]}$$

where D is the dimension of space, $k_B$ is the Boltzmann constant and $m_g$ is particle mass. The MB distribution function $f^{eq}$ describes the most likely equilibrium state under the given condition and may be defined by Equation 4.

$$f^{eq} = \rho(\pi\theta)^{-D/2} \exp(-\|v-u\|^2) \quad \text{[Equation 4]}$$

where the dimensionless variables $\theta$, v and u are defined by Equations 5 to 7.

$$\theta \equiv 2 k_B T/m_g \quad \text{[Equation 5]}$$

$$v = \theta^{-1/2} V \quad \text{[Equation 6]}$$

$$u = \theta^{-1/2} U \quad \text{[Equation 7]}$$

The discretized version of the Boltzmann equation, Equation 1, in phase space and time may be written by Equation 8.

$$f_i(x+V_i t, t+\Delta t) - f_i(x,t) = -[f_i(x,t) - f_i^{eq}(x,t)]/\tau \quad \text{[Equation 8]}$$

where $f_i(x,t)$ is the probability for a particle to exist in a lattice site x at time t with discrete velocity $V_i$.

The essential work of the discretization is to find the discretized MB distribution function $f_i^{eq}$ satisfying Equation 9 to conserve physical properties such as mass, momentum, energy, etc.

$$\int v^m f^{eq}(v) dV = \Sigma_i v_i^m f_i^{eq}(v_i) \quad \text{[Equation 9]}$$

where $\int v^m f^{eq}(v) dV$ is the m-th order moment of V. The equilibrium distribution $f^{eq}$ may be expressed by a series expansion $f^{eq}_E$ having the form of Equation 10.

$$f^{eq}(V) \approx f^{eq}_E(v) = \exp(-v^2) P^{(N)}(v) \quad \text{[Equation 10]}$$

where $P^{(N)}(v)$ is a polynomial of degree N in v, and $v^2 = v \cdot v$. Also, $f^{eq}_E$ may be expressed in the form of Equation 11.

$$f_i^{eq}(v_i) = w_i P^{(N)}(v_i) \quad \text{[Equation 11]}$$

where $w_i$ are weight coefficients corresponding to the discrete velocities $v_i$. By applying Equation 10 and Equation 11 to Equation 9, Equation 12 is obtained.

$$\int \exp(-v^2) P^{(m+N)}(v) dv = \Sigma_i w_i P^{(m+N)}(v_i) \quad \text{[Equation 12]}$$

A systematic procedure will be started with 1-dimensional space. Equation 13 is satisfied for any polynomial of degree m+N for the macroscopic velocity, represented by Equation 12, where n is a non-negative integer.

$$\int v^n \exp(-v^2) dv = \Sigma_i w_i v_i^n \quad \text{[Equation 13]}$$

The left side of Equation 13 is calculated to give Equation 14.

$$\int v^n \exp(-v^2) dv = \begin{cases} \Gamma((n+1)/2) & \text{for } n = 2k, \\ 0 & \text{for } n = 2k+1 \end{cases}$$ [Equation 14]

where k is a non-negative integer and $\Gamma$ is the Gaussian Gamma function which may be expressed by the double factorial as Equation 15.

$$\Gamma((n+1)/2) = \sqrt{\pi}(n-1)!!/2^{n/2}$$ [Equation 15]

The system of Equation 13 may be made more concise by considering symmetry. That is to say, q 1-dimensional discrete velocity models may be obtained by defining the discrete velocities $v_i$ and the weight coefficients $w_i$ as Equation 16.

$$v_1 = 0, v_{2i} > 0,$$

$$v_2 < v_4 < \ldots < v_{q-1},$$

$$v_{2i} = -v_{2i+1},$$

and $$w_{2i} = w_{2i+1}$$ [Equation 16]

for i=1, 2, . . . , [q/2]
where [x] is the greatest integer that is smaller than or equal to x. q is regarded as an odd number to include the zero velocity $v_1$. To use regular lattices, the ratios of $v_i$ should be rational numbers. Therefore, the constrains of Equation 17 are given.

$$v_{2(i+1)}/v_2 = p_{2(i+1)}/p_2 = \bar{p}_{2(i+1)}$$ [Equation 17]

for i=1, 2, . . . , [q/2]−1
where $p_2$ and $p_{2(i+1)}$ are relatively prime and $P_{2(i+1)} > p_{2i}$. These models have 2q variables composed of the discrete velocities $v_i$ and the weight coefficients but have only q unknown variables when considering the symmetry (Equation 16).

If $p_2$ and $p_{2(i+1)}$ are given, all $v_i$ may be expressed by $v_2$. Consequently, there remain n' unknown variables. n' is defined by Equation 18.

$$n' \equiv (q+3)/2$$ [Equation 18]

The variables defined by Equation 16 satisfy Equation 19 for any odd number n.

$$\Xi(n) \equiv \Sigma w_i v_i^n = 0$$ [Equation 19]

Therefore, to find the n' unknown variables, n' equations are needed, which are $$\{\Xi(n) = \Gamma((n+1)/2) | n = 0, 2, \ldots, 2(n'-1)\}$$ [Equation 20]

If the solution of Equation 20 exists, it satisfies the polynomial of degree m+N up to 2(n'−1)+1 =q+2, in Equation 12.

When considering a q'-discrete velocities model excluding the zero velocity, it satisfies the polynomial up to m+N=q'+1 where q' is an even number. This means that a q-discrete velocities model satisfies the same order of the moment accuracy m+N as a (q+1)-discrete velocities model for an odd number q. Therefore, an odd number is preferred for the number of discrete velocities from the viewpoint of minimizing the discrete velocities.

Equation 20 may be reduced to a univariate polynomial equation. For this, w, A, $\bar{p}^n$ and $\Gamma$ may be defined by Equation 21.

$$w = \begin{bmatrix} w_2 \\ w_4 \\ \vdots \\ w_{q-1} \end{bmatrix},$$ [Equation 21]

$$A = \begin{bmatrix} \bar{p}_2^2 & \bar{p}_4^2 & \cdots & \bar{p}_{q-1}^2 \\ \bar{p}_2^4 & \bar{p}_4^4 & \cdots & \bar{p}_{q-1}^4 \\ \vdots & \vdots & \ddots & \vdots \\ \bar{p}_2^{q-1} & \bar{p}_4^{q-1} & \cdots & \bar{p}_{q-1}^{q-1} \end{bmatrix},$$

$$\bar{p}^n = \begin{bmatrix} \bar{p}_2^n \\ \bar{p}_4^n \\ \vdots \\ \bar{p}_{q-1}^n \end{bmatrix}^T,$$

$$\Gamma = \frac{1}{2} \begin{bmatrix} v_2^{-2} \Gamma((2+1)/2) \\ v_2^{-4} \Gamma((4+1)/2) \\ \vdots \\ v_2^{-(q-1)} \Gamma(((q-1)+1)/2) \end{bmatrix},$$

where the subscript T is used for a transpose, $\bar{p}_{2(i+1)}$ is the magnitude of $v_{2(i+1)}$ relative to $v_2$, as defined in Equation 17, and $\bar{p}_2 = 1$.

Equation 20 may be expressed by Aw=$\Gamma$, $\bar{p}^{q+1} w = (2v_2^{q+1})^{-1} \Gamma(((q+1)+1)/2)$, and $\Sigma_i w_i = \sqrt{\pi}$. If w is eliminated from the first two relations, a relation processing only the variable $v_2$ with parameters $\bar{p}_{2(i+1)}$ is obtained as follows.

$$\bar{p}^{q+1} A^{-1} \Gamma = (2v_2^{q+1})^{-1} \Gamma(((q+1)+1)/2)$$ [Equation 22]

To perform discretization of velocities, the weight coefficients should be obtained. Accordingly, the weight coefficients corresponding to the discrete velocities of the fluid particles are calculated based on the univariate polynomial equation, Equation 22 (S40).

Once the solution $v_2$ is found from Equation 22, the weight coefficients $w_i$, may be obtained from w=$A^{-1}\Gamma$ and $$w_1 = 1 - \sum_{k=2}^{q} w_k.$$

The weight coefficients $w_i$ may be approximated by rounding off at a predetermined decimal point.

And, the discrete velocities $v^i$ may be obtained from Equation 17. With this, the discretization of velocities is completed.

Subsequently, a lattice Boltzmann model is derived using the weight coefficients and discrete velocities (S50).

The discrete velocities $v_i$ may be easily discretized using the calculated weight coefficients $w_i$. Accordingly, at least one of physical properties comprising temperature, density, pressure and speed of the fluid may be measured based on the lattice Boltzmann model.

Figure 7:
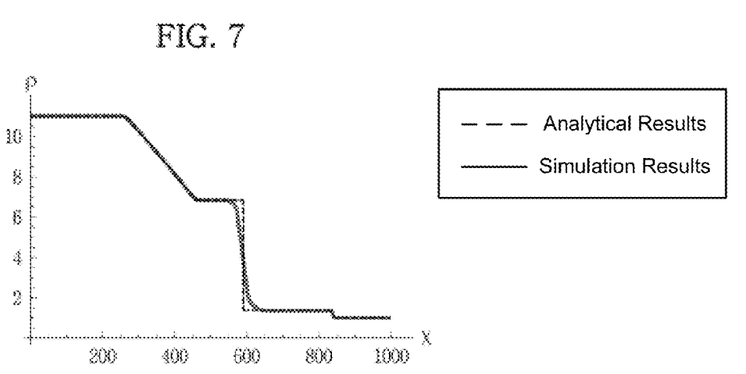
FIG. 7 shows a result of measuring density based on the lattice Boltzmann model illustrated in FIG. 1.
Figure 8:
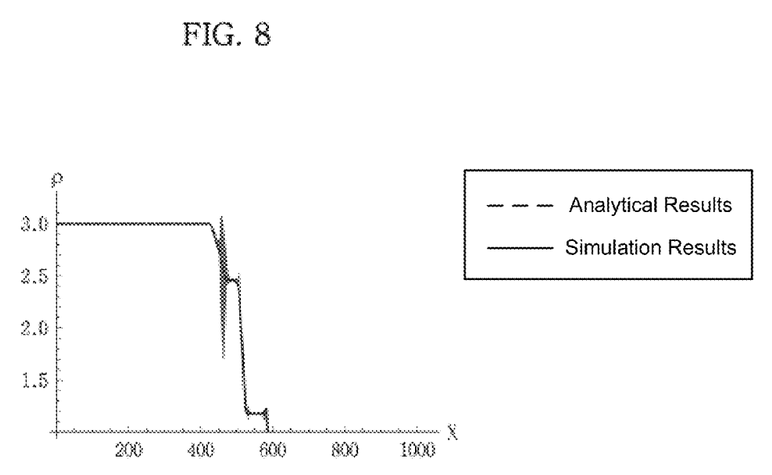
FIG. 8 shows a result of comparing the density measurement result according to the present disclosure with that based on the conventional lattice Boltzmann model.
Figure 9:
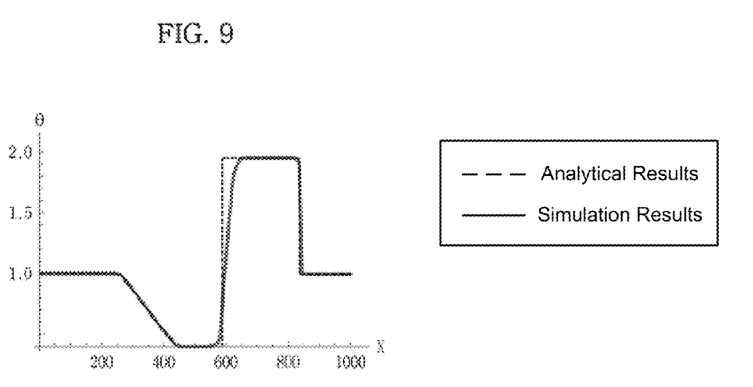
FIG. 9 shows a result of measuring temperature based on the lattice Boltzmann model illustrated in FIG. 1.

FIG. 7 shows a result of measuring density based on the lattice Boltzmann model illustrated in FIG. 1. FIG. 8 shows a result of comparing the density measurement result according to the present disclosure with that based on the conventional lattice Boltzmann model. And, FIG. 9 shows a result of measuring temperature based on the lattice Boltzmann model illustrated in FIG. 1.

In FIG. 7 and FIG. 8, the dashed lines show analytical results whereas the solid lines show simulation results according to the present disclosure for measurement of particle density. In the graphs, the abscissa (x) represents the relative position of the shock tube and the ordinate (ρ) represents the density of fluid particles.

As seen from FIG. 7, the result of measuring the particle density based on the lattice Boltzmann model according to the present disclosure is very stable up to ρ=11.

In contrast, the simulation result according to the conventional method is unstable even for ρ=3, as seen from FIG. 8.

Also, as seen from FIG. 9, the result of measuring the temperature θ based on the lattice Boltzmann model according to the present disclosure is very stable.

Accordingly, it may be seen that the method for simulating fluid flow according to the present disclosure allows derivation of a lattice Boltzmann model exhibiting remarkably improved stability.

A computer program for performing the method for simulating fluid flow described above may be recorded in a computer-readable recording medium.

As described, the method for simulating fluid flow and the recording medium for performing the method according to the present disclosure use the univariate polynomial equation providing excellent easiness to derive a lattice Boltzmann model. As a result, the lattice Boltzmann model may be derived more easily as compared to the conventional method, and the stability and accuracy of the lattice Boltzmann model may be ensured.

According to the method for simulating fluid flow and the recording medium for performing the method of the present disclosure, the weight coefficients corresponding to the discrete velocities are calculated by comparing the n-th order momentum of velocity between the Maxwell-Boltzmann distribution and the discretized Maxwell-Boltzmann distribution and thus the lattice Boltzmann model is obtained. Accordingly, by increasing the order satisfying the velocity momentum, the instability of the lattice Boltzmann model may be overcome and the desired accuracy may be acquired.

Furthermore, since the univariate polynomial equation is used to derive the lattice Boltzmann model, the lattice Boltzmann model may be derived more effectively.

While the present disclosure has been described with respect to the specific embodiments, it will be apparent to those skilled in the art that various changes and modifications may be made without departing from the spirit and scope of the disclosure as defined in the following claims.

What is claimed is:

1. A method for simulating fluid flow comprising:
   discretizing a 1-dimensional space in which fluid flows into a regular lattice;
   assuming that fluid particles of the fluid repetitively move and collide in the regular lattice;
   deriving a univariate polynomial equation using a Gaussian Gamma function by comparing an n-th order momentum of velocity between a Maxwell-Boltzmann distribution and a discretized Maxwell-Boltzmann distribution including unknown weight coefficients $w_i$ corresponding to given discrete velocities $v_i$, wherein n is a non-negative integer and wherein the discrete velocities $v_i$ and the unknown weight coefficients $w_i$ are defined as follows:

$v_1=0, v_{2i}>0,$ $v_2<v_4<\ldots<v_{q-1},$ $v_{2i}=-v_{2i+1},$ and $w_{2i}=w_{2i+1}$ for i=1, 2, ..., [q/2],
   wherein [q/2] is the largest integer that is smaller than or equal to q/2, and q is an odd number;
   calculating the unknown weight coefficients $w_i$ corresponding to the given discrete velocities $v_i$ of the fluid particles based on the comparison; and
   deriving a lattice Boltzmann model using the calculated weight coefficients $w_i$, the given discrete velocities $v_i$ and the discretized Maxwell-Boltzmann distribution, the lattice Boltzmann model for simulating the flow of the fluid into the regular lattice.

2. The method for simulating fluid flow according to claim 1, which further comprises measuring at least one of physical properties including temperature, density, pressure and speed of the fluid based on the lattice Boltzmann model.

3. The method for simulating fluid flow according to claim 1, wherein spacing between lattice sites of the regular lattice corresponds to a mean free path.

4. The method for simulating fluid flow according to claim 1, wherein the fluid particles exist only on lattice sites of the lattice.

5. The method for simulating fluid flow according to claim 1, wherein said calculating the weight coefficients $w_i$ of the fluid particles further comprises determining approximate values of the weight coefficients $w_i$ by rounding off at a predetermined decimal point.

6. The method for simulating fluid flow according to claim 1, wherein said deriving the univariate polynomial equation further comprises defining a ratio of the discrete velocities $v_i$ as follows:

$v_{2(i+1)}/v_2 = p_{2(i+1)}/p_2 \bar{p}_{2(i+1)}$ for i=1, 2, ..., [q/2]−1
   wherein $p_2$ and $p_{2(i+1)}$ are relatively prime and $p_{2(i+1)} > p_{2i}$.

7. The method for simulating fluid flow according to claim 6, wherein said deriving the univariate polynomial equation further comprises deriving the univariate polynomial equation as follows to obtain real positive solutions of $v_2$ under a given q, $\bar{p}^{q+1}$, and A and to obtain a positive $w_i$ for i=1, 2, ..., q from Equation 2:

$$\bar{p}^{q+1} A^{-1} \Gamma = (2v_2^{q+1})^{-1}(((q\Pi)1) + /2) +, \quad \text{Equation 1}$$

wherein $\bar{p}^{q+1} = \begin{bmatrix} \bar{p}_2^{q+1} \\ \bar{p}_4^{q+1} \\ \vdots \\ \bar{p}_{q-1}^{q+1} \end{bmatrix}^T$, $$A = \begin{bmatrix} \bar{p}_2^2 & \bar{p}_4^2 & \cdots & \bar{p}_{q-1}^2 \\ \bar{p}_2^4 & \bar{p}_4^4 & \cdots & \bar{p}_{q-1}^4 \\ \vdots & \vdots & \ddots & \vdots \\ \bar{p}_2^{q-1} & \bar{p}_4^{q-1} & \cdots & \bar{p}_{q-1}^{q-1} \end{bmatrix}, \text{ and}$$

$$\Gamma = \frac{1}{2} \begin{bmatrix} v_2^{-2}\Gamma((2+1)/2) \\ v_2^{-4}\Gamma((4+1)/2) \\ \vdots \\ v_2^{-(q-1)}\Gamma(((q-1)+1)/2) \end{bmatrix},$$

$\bar{p}_{2(i+1)}$ for i=1, 2, ..., [q/2]−1 and $\bar{p}_2$=1; the subscript T is used for a transpose, and Γ is the Gaussian Gamma function which can be expressed by the double factorial as $$\Gamma((n+1)/2) = \sqrt{\pi}(n-1)!!/2^{n/2}$$

for n=2, 4, ..., q−1

$$Aw = \Gamma \text{ and } \Sigma_i w_i = \sqrt{\pi} \quad \text{Equation 2:}$$

for i=1, 2, ..., q wherein $$Aw = \Gamma \text{ and } \sum_i w_i = \sqrt{\pi} \text{ for } i = 1, 2, \ldots, q \text{ wherein } w = \begin{bmatrix} w_2 \\ w_4 \\ \vdots \\ w_{q-1} \end{bmatrix}.$$

8. A non-transitory computer-readable recording medium storing a computer program including executable code for simulating fluid flow, the code when executed performs steps comprising:
discretizing a 1-dimensional space in which fluid flows into a regular lattice;
assuming that fluid particles of the fluid repetitively move and collide in the regular lattice;
deriving a univariate polynomial equation using a Gaussian Gamma function by comparing an n-th order momentum of velocity between a Maxwell-Boltzmann distribution and a discretized Maxwell-Boltzmann distribution including unknown weight coefficients $w_i$ corresponding to given discrete velocities $v_i$ wherein n is a non-negative integer and wherein the discrete velocities $v_i$ and the unknown weight coefficients $w_i$ are defined as follows:

$$v_1 = 0, v_{2i} > 0,$$

$$v_2 < v_4 < \ldots < v_{q-1},$$

$$v_{2i} = -v_{2i+1},$$

and $$w_{2i} = w_{2i+1}$$

for i=1, 2, ..., [q/2],
wherein [q/2] is the largest integer that is smaller than or equal to q/2, and q is an odd number;
calculating the unknown weight coefficients $w_i$ corresponding to the given discrete velocities $v_i$ of the fluid particles based on the comparison; and
deriving a lattice Boltzmann model using the calculated weight coefficients $w_i$, the given discrete velocities $v_i$ and the discretized Maxwell-Boltzmann distribution, the lattice Boltzmann model for simulating the flow of the fluid into the regular lattice.

* * * * *